United States Patent [19]
Tonelli et al.

[11] Patent Number: 5,262,057
[45] Date of Patent: Nov. 16, 1993

[54] PROCESS FOR SEPARATING FROM ONE ANOTHER THE NON-FUNCTIONAL, MONOFUNCTIONAL AND BIFUNCTIONAL SPECIES CONTAINED IN THE PERFLUOROPOLYOXYALKYLENES

[75] Inventors: Claudio Tonelli; Stefano Turri, both of Milan; Giuseppe Gianotti, Novara; Marinella Levi, Milan, all of Italy

[73] Assignee: Ausimont S.p.A., Milan, Italy

[21] Appl. No.: 962,936

[22] Filed: Oct. 19, 1992

[30] Foreign Application Priority Data

Oct. 21, 1991 [IT] Italy .................... MI91A002774

[51] Int. Cl.⁵ .................................... B01D 15/08
[52] U.S. Cl. ........................... 210/656; 210/635; 570/262
[58] Field of Search ............ 210/635, 656, 198.2, 210/502.1; 570/262

[56] References Cited

U.S. PATENT DOCUMENTS

| | | | |
|---|---|---|---|
| 3,544,537 | 12/1970 | Brace | 260/89.5 |
| 3,665,041 | 5/1972 | Sianesi et al. | 260/615 A |
| 3,766,251 | 10/1973 | Caporiccio et al. | 260/486 H |
| 3,810,874 | 5/1974 | Mitsch et al. | 260/75 H |
| 3,847,978 | 11/1974 | Sianesi et al. | 260/535 H |
| 4,647,413 | 3/1987 | Savu | 260/544 E |
| 4,814,372 | 3/1989 | Caporiccio et al. | 528/485 |

FOREIGN PATENT DOCUMENTS

| | | | |
|---|---|---|---|
| 0148482 | 7/1985 | European Pat. Off. | 210/198.2 |
| 0151877 | 8/1985 | European Pat. Off. | 210/198.2 |

*Primary Examiner*—Ernest G. Therkorn
*Attorney, Agent, or Firm*—Bryan Cave

[57] ABSTRACT

A process for separating from one another non-functional, monofunctional and bifunctional species in a mixture of perfluoropolyoxyalkylenes of general formula $$X-O-R_f-Y$$

where:
$R_f$ = a perfluoropolyoxyalkylene chain comprising monomeric units of formulas $(CF_2O)$, $(CF_2CF_2O)$, $(CF_2CF_2CF_2O)$,
X, Y, like or different from each other, are non-functional end groups or end groups containing functions OH and/or $NH_2$, which consists in subjecting said mixture of perfluoropolyoxyalkylenes to column chromatography using, as eluents, non-polar fluorinated solvents, either alone or in admixture with polar solvents.

8 Claims, 1 Drawing Sheet

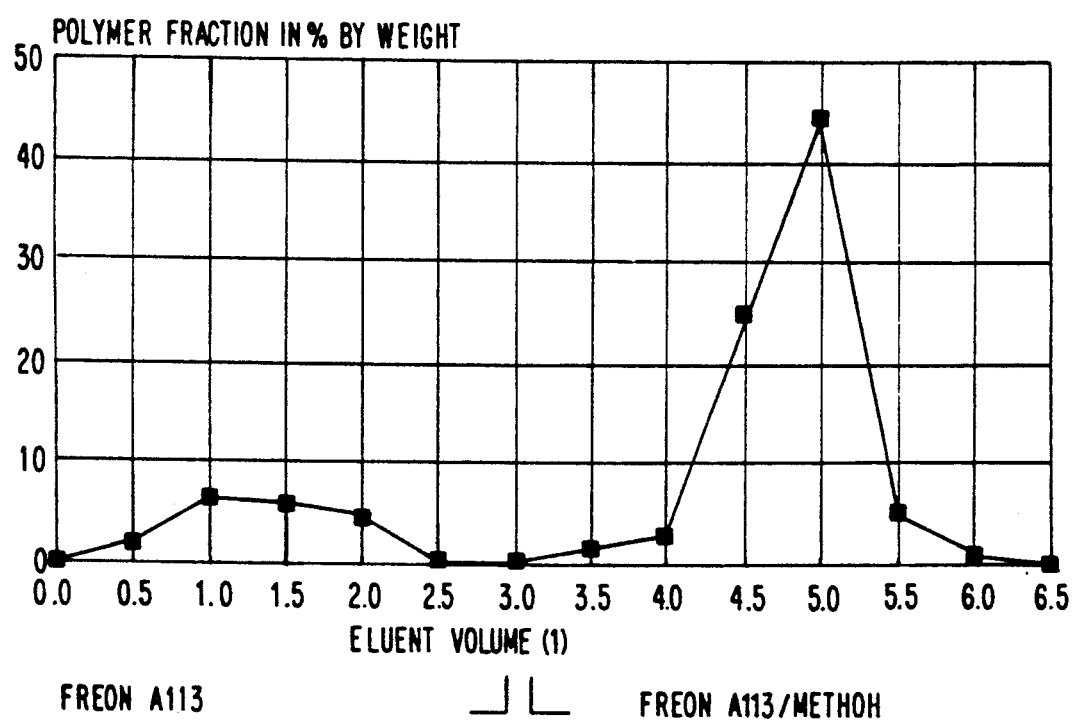

PROCESS FOR SEPARATING FROM ONE ANOTHER THE NON-FUNCTIONAL, MONOFUNCTIONAL AND BIFUNCTIONAL SPECIES CONTAINED IN THE PERFLUOROPOLYOXYALKYLENES

The present invention relates to a method for separating in non-functional, monofunctional and bifunctional species, perfluoropolyoxyalkylenes consisting of, or comprising macromolecules of general formula $$X-O-Rf-Y \qquad (I)$$

wherein:

Rf = a perfluoropolyoxyalkylene chain having a number average molecular weight ranging from about 500 to about 10,000 and comprising one or more perfluorooxyalkylene units of formula $(CF_2CF_2O)$, $(CF_2O)$, $(CF_2CF_2CF_2O)$ statistically arranged along said chain, X, Y, like or different from each other, are functional groups of formula $-CF_2-CH_2O(CH_2CH_2O)_sH$, $-CF_2-CF_2CH_2O(CH_2CH_2O)_sH$, $-CF_2CH_2NH_2$, or non-functional groups of formula $-CF_2CF_2CF_3$, $-CF_2CF_2Cl$, $-CF_2CF_3$, $CF_2Cl$, $-CF_3$, $-CFCl_2$, $CF_2Br$, $-CFBr_2$, s = a number ranging from 0 to 2, extremes included, with X and/or Y in parts of such macromolecules being $-CF_2-CH_2O(CH_2CH_2O)_sH$ and/or $-CF_2CF_2CH_2O(CH_2CH_2O)_sH$ and/or $-CF_2CH_2NH_2$ groups.

In particular, in such formula (I), the perfluoropolyoxyalkylene chain Rf can have one of the following structures:

(1) $-(CF_2CF_2O)_n(CF_2O)_m-$ with the ratio n/m ranging from 0.2 to 1.5
(2) $-(CF_2CF_2CF_2O)_p-$
(3) $-(CF_2CF_2O)_n-$ where n, m, p are numbers ranging from 0 to 100, extremes included, the sum of which being such that Rf exhibits a (number) average molecular weight ranging from about 500 to about 10,000, but preferably from about 2,000 to about 4,000, with a molecular weight distribution ranging from 1.5 to 2.5. Minor amounts of monomeric units of formula $-(CF_2-C_2-CF_2CF_2O)-$ can be present also in the Rf chain.

The perfluoropolyoxyalkylenes of formula (I), both the ones with non-functionalized end groups and the ones with functionalized end groups ($-CF_2CF_2CH_2O(CF_2CH_2O)_sH$, $-CF_2CH_2O(CH_2CH_2O)_sH$, $-CF_2CH_2NH_2$) are known in the art. The preparation thereof is described, for example, in U.S. Pat. Nos. 3,766,251, 3,810,874 and in European patent application No. 148,482.

Generally, such perfluoropolyoxyalkylenes are available in the form of mixtures of macromolecules having one or both end groups composed of the above-mentioned functional groups (with little amounts of macromolecules having both end groups non-functionalized).

Thanks to the presence of functional groups, such macromolecules are utilizable as macromonomers in several reactions, for example polycondensation reactions, besides as lubricants, surfactants and anticorrosive agents.

However, owing to the difficulty to separate from one another by conventional methods, for example by distillation, the various species of non-functional, monofunctional and bifunctional macromolecules, it is always necessary to use only mixtures of such species in the various reactions or applications.

In particular, as is well known, in the polycondensation reactions, the presence of monofunctional species in the perfluoropolyoxyalkylene mixtures leads to stochastic interruptions of the polymeric chains.

That is a remarkable drawback from a practical viewpoint, since the resulting polymers exhibit not reproduceable and, at any rate, non optimal characteristics, in particular as regards the obtainment of high molecular weights.

For example, the perfluoropolyoxyalkylene containing hydroxylic end groups, obtained from perfluoropolyoxyalkylene containing $CF_2O$ and $CF_2CF_2O$ units, commercially known as Fomblin $Z^{(R)}$, has a bifunctional species content of about 90–95%, the remaining species being composed of monofunctional or non-functional perfluoropolyoxyalkylenes.

Thus, it is a particular object of the present invention to provide a process for preparing bifunctional perfluoropolyoxyalkylenes (i.e. with both end groups consisting of hydroxylic and/or aminic groups) free from monofunctional species.

Generally, it has been found by the Applicant that it is possible to obtain the separation from one another of one or more of the species of non-functional, monofunctional and bifunctional macromolecules, which form the perfluoropolyoxyalkylenes of formula (I), or to obtain the enrichment of such perfluoropolyoxyalkylenes with at least one of the abovesaid species, by means of column chromatography carried out according to the modalities specified hereunder.

By column chromatography is meant herein the known method for obtaining the separation from one another of two or more components of a mixture, which consists in conveying substances contained in such mixture through a stationary phase by means of a moving phase. On this way, the individual substances are caused to slow down by the stationary phase as a function of the interactions which generate among mixture, moving phase and stationary phase. This slow-down is selective and therefore, with a proper system of moving and stationary phase, the slow-down degree will be different for each component of the sample.

References to this method are contained in:

Snyder L. R.—"Principles of Adsorption Chromatography", 1968, MARCEL DEKKER

Cassidy H. G.—"Fundamentals of Chromatography"1957, INTERSCIENCE PUBLISHERS.

BRIEF DESCRIPTION OF THE DRAWING

The sole FIGURE shows a profile of polymer elution bands as a function of the eluted solvent volume.

DESCRIPTION OF THE PREFERRED EMBODIMENTS

The modalities employed by the Applicant in order to obtain via chromatography the separation of, and/or the enrichment with the various species composing the perfluoropolyoxyalkylenes of formula (I) are, in the order, the following:

a) preparing a stationary phase, by treatment of a solid phase, which is composed of a compound containing active sites and/or groups capable of forming bonds or interactions of the polar type, or hydrogen bonds, with the hydroxylic end groups of the perfluoropolyoxyalkylenes of formula (I), with a non-polar fluorinated solvent. Such a treatment consists in wetting or soaking the solid phase with said solvent, and it can be carried out on the solid phase when it is already in the chromatographic column, or separately, subsequently introducing the solid phase so obtained into the column. Preferably, but not necessarily, a solvent volume twice the one of the chromatographic column is used for such treatment. Preferably, the stationary phase contains, as active sites or groups, free hydroxylic groups, which in the case of silica are represented by silanol groups; or it has the capability of generating positive electrostatic fields directed towards the outside of the solid phase surface, as in the case, for example, of alumina. Examples of compounds which are preferred as stationary phase are silica gel, activated aluminas, magnesium oxide, Al and Mg silicates, such as e.g. Forisil(R). Preferably such compounds exhibit an average diameter of the pores below 200 Å;

b) adsorption of the perfluoropolyoxyalkylene by the stationary phase, carried out by feeding to the column head a perfluoropolyoxyalkylene solution in the minimum amount of the above-mentioned non-polar fluorinated solvent;

c) elution of the perfluoropolyoxyalkylene so adsorbed by feeding the above-mentioned non-polar solvent to the column head;

d) further subsequent elution of the perfluoropolyoxyalkylene by feeding to the column head a mixture composed of the above-mentioned non-polar solvent and of a polar solvent, with volume ratios of the former to the latter preferably ranging from about 9/1 to about 1/1;

e) washing the column containing the stationary phase with a pure non-polar solvent, and optionally f) recharging the stationary phase with a further perfluoropolyoxyalkylene sample to be subjected to chromatographic analysis according to the preceding steps (c) to (f).

Thus, an object of the present invention is a process for separating from one another one or more of the species of non-functional, monofunctional and bifunctional macromolecules, which constitute the perfluoropolyoxyalkylene of formula (I), which process consists in subjecting said perfluoropolyoxyalkylene to a column chromatography treatment under the above-cited conditions.

Non-polar fluorinated solvents suitable for being utilized in all the above-illustrated steps from (a) to (d) are all the fluorine-containing organic solvents endowed with an eluotropic strength $\epsilon < 0.05$ (referred to silica), capable of dissolving the perfluoropolyoxyalkylenes of formula (I) in an amount of at least 20 g per liter of solvent.

Delifrene 113 (R) (1,1,2-trichloro-1,2,2-trifluoroethane) is preferably used as a non-polar solvent.

As polar solvents it is possible to utilize all the organic solvents, which are mixable with the above-mentioned non-polar solvents, are endowed also with acid or basic functions and have an eluotropic strength value, referred to silica, $\epsilon > 0.30$ and preferably $> 0.4$.

As polar solvents are utilizable, for example, alcohols, ketones, carboxylic acids, nitriles, amides, esters, alkylsulphoxides. As an example there are cited: methanol, ethanol, propanol, acetic acid, methyl or ethyl acetate, acetonitrile, dimethylformamide, acetone, methyl-ethyl-ketone, dimethylsulphoxide.

As regards the stationary phase, the particle size is not a critical element for the process effectiveness. Generally, the particle size employed is the one which is typical of the products utilized in chromatography.

Among the various types of utilizable stationary phases, alumina, preferably but not necessarily neutral, in particular alumina 150 mesh, 58 Å, as well as silica gel 70–230 mesh, 60 Å and 100 Å, and silica gel 230–400 mesh, 60 Å have proved to be particularly effective.

By means of the above-described steps (a) to (d) it is possible to obtain the separation of the non-functional species from the monofunctional and bifunctional species which compose the sample. In particular, step (c) permits the separation of the non-functional species with a little portion of the monofunctional species, while step (d) permits to fully separate from the column the mixture of monofunctional and bifunctional species, which was originally present in the sample.

In order to obtain also a substantial separation of the monofunctional species from the bifunctional species it was necessary to carry out, prior to the above-illustrated step (a), a further step, hereinafter referred to as (A), which consists in treating the stationary phase, before its utilization, with a mixture composed of a non-polar fluorinated solvent and of a polar solvent, as are described hereinbefore, such mixture having an eluotropic strength $\epsilon$ of at least 0.2 referred to silica. Such a treatment consists in suspending the solid phase in said solvent mixture and then in homogeneously filling the chromatographic column with the suspension so obtained.

Such treatment is preferably effected by introducing the solvent mixture into the column which already contains the stationary phase.

Preferably, but not necessarily, said operative step (A) is carried out by operating with volume ratios between solvent mixture and stationary phase in the range of from 3/1 to 5/1.

Before using the stationary phase in the separation process, it may be advisable to wash said stationary phase especially if it has been directly purchased from the market with an alcohol (methanol, ethanol, etc.) in order to remove impurities (surfactants, emulsifiers), which are always contained in the commercial products.

Such operation, although not always strictly necessary, can be effected in the chromatographic column or in any other vessel.

After said washing, the stationary phase is dried at temperatures usually ranging from 100° to 150° C.

As mentioned hereinbefore, in operative step (A) the ratio between polar solvent and non-polar solvent in the solvent mixture shall be such that the mixture exhibits an eluotrophic strength $\epsilon$ equal to at least 0.2. Preferably, the $\epsilon$ value ranges from 0.3 to 0.6. For the determination of the $\epsilon$ values, the simplified method proposed by L. Snyder (op.cit., Appendix III) has been used.

Step (a), consisting in washing the stationary phase with a non-polar fluorinated solvent, has the purpose of wetting the stationary phase as well as of removing the polar solvent excess which is present in the column if step (a) has been preceded by step (A). The non-polar solvent amount used in such step is not critical; it can vary from 2 to 5 times the volume of the solvent mixture utilized for step (A)— if this step has been carried out— as a function of the column dimensions and of the ageing degree (due to preceding separation steps) of the stationary phase.

The combination of operative steps (A) and (c) is of the utmost importance for the success of the separation process if the purpose is that of obtaining an at least partial separation of the bifunctional species from all the other species. In such case, by means of step (c) it is possible to obtain a substantial elution of the perfluoropolyoxyalkylene fraction having lower functionality (non-functional and monofunctional species).

In this case, a substantially monomodal elution peak, with the maximum at 1–1.5 liters of eluted non-polar solvent, is obtained in the commonest commercial polymeric products.

Additions of non-polar solvent, besides the amount corresponding to the closure of said elution peak, do not lead to a separation of further amounts of polymer.

Lastly, in operative step (d), the elution of the total, or almost total amount of polymer as bifunctional species is obtained.

For example, with perfluoropolyether samples containing in the aggregate 10–15% of non-functional and monofunctional species, by means of operative step (d) it is possible to remove 80–90% of polymer as bifunctional species.

Failing operative step (A), the separation of the bifunctional species would be almost nil (below 2% of the polymer), while every subsequent elution using a higher polarity solvent would involve a simultaneous elution of all the monofunctional and bifunctional species present in the polymer.

The content of non-functional, bifunctional and monofunctional species in each eluted fraction varies as a function of the type of the utilized polar solvent.

For example, by using a mixture of Delifrene 113 and ethyl acetate (from 9/1 to 1/1 by volume) it is possible to obtain the separation of a tail fraction containing up to 100% of bifunctional species.

In the step for separating the bifunctional monomers, the fluorinated non-polar solvent/polar solvent volume ratio in the elution mixture, which preferably ranges from about 9/1 to 1/1, can vary, however, over a wider range, as a function of the minimum E value of the pure polar solvent.

In this operative step the utilized polar solvent and/or non-polar solvent can also be different from the ones utilized in steps (A) and (a).

For profitability reasons, however, it is preferable that the solvents should be the same in the two steps.

In step (e) the stationary phase is restored by washing with a non-polar fluorinated solvent in order to make said phase ready for a new chromatographic separation operation with another polymer sample through steps (b) to (d).

In elution steps (c) and (d), the non-polar solvent and/or the mixture of non-polar solvent and polar solvent can be added into the chromatographic column in any volumes and batchwise.

By the process of the invention it is possible to carry out several successive separation cycles with unaltered separative effectiveness.

The Applicant has experimented up to 30 consecutive cycles, taking only care of reducing only by a few units per cent the weight of the successive charges every 2 or 3 runs for more than 1,500 g of polymer, in whole, for 250 g of stationary phase.

That renders the process of the invention very interesting for commercial-scale applications.

The process of the invention can be conducted at atmospheric pressure or at a higher pressure. If it is operated at a higher pressure than the atmospheric pressure, the obtained results are qualitatively similar to the ones obtained at atmospheric pressure with the advantage of a sensible reduction of the operative times.

It is possible to operate at room temperature or at a higher or lower temperature. Room temperature and temperatures below room temperature are preferred.

The process can be applicated to the chromatography of the perfluoropolyoxyalkylenes containing hydroxylic or aminic functions in the same macromolecule, or also to mixtures of perfluoropolyoxyalkylenes having hydroxylic and aminic functions, respectively.

A few examples illustrating the object of the present invention are given hereinafter; such examples, however, are not to be considered as limitative.

The operative modalities followed for practising the process of such examples, at atmospheric pressure or at a higher pressure, are the following:

(a) Chromatography at atmospheric pressure

The fluorinated sample (about 10% by weight calculated on the stationary phase) is dissolved in the minimum amount of non-polar fluorinated solvent, charged and made to be adsorbed at the column head.

It is also possible to add the sample by firstly preparing a dispersion thereof in a little amount of the material which form the stationary phase, and then by adding such dispersion to the stationary phase at the column head.

The sample is eluted with a non-polar fluorinated solvent (for example 1,000–2,000 ml/10 g of polymer), thereby obtaining a head fraction composed of a non-functional polymer or of a polymer having a low content of functional species.

A further addition of non-polar solvent does not permit, at this stage, to obtain a second fraction, for the elution of which it is necessary to change (increase) the polarity and, by consequence, the eluotropic strength of the moving phase.

If the stationary phase has been subjected to operative step (A), and starting from a sample containing 10–20% of non-functional and monofunctional species, therefore eluting with a mixture of 9 parts of non-polar solvent and 1 part of organic polar solvent, the main fraction is recovered (70–85% by weight referred to the starting sample, using about 500–1,000 ml of such solvent mixture per 10 g of polymer). The tail fraction, consisting of a few % of a polymer having a low molecular weight and a very high functionality, is eluted with an equivolumetric mixture of non-polar solvent and polar solvent (500 ml) till reaching a total recovery of about 96–98% calculated on the charged sample.

The annexed figure shows the profile of the polymer elution bands as a function of the eluted solvent volume, for a test conducted on 80 g of a perfluoropolyoxyalkylene sample having an average molecular weight (M.W.) of about 2,000, composed for 5% of monofunctional macromolecules and for 95% of bifunctional macromolecules, having hydroxylic functionality and having formula (I), where Rf has structure (1), with n/m equal to about 1, s=0, subjected to chromatography on about 800 g of silica gel 70–230 mesh.

As it can be observed, the profile of the elution band surprisingly shows an interruption or at least a very remarkable weakening after the first 10–15% of eluted polymer. That corresponds to the fraction rich in monofunctional chains.

Furthermore, it has surprisingly been observed that, once all the polymer in the column is eluted, it is possible to recondition said column by repeatedly washing it with a non-polar solvent (about 2 volumes) and to charge it again with the same amount of polymer. In the present case, an unaltered efficiency of the column for at least 30 complete cycles has been observed, although the highest limit of such process it not known.

The last-mentioned result is absolutely surprising and unexpected, since in the conventional chromatographic processes it is generally possible to pass from a less polar solvent to a polar solvent having a higher polarity, but not vice-versa, without substantially altering the bed characteristics.

(b) Chromatography under pressure

It is possible to operate with overpressures ranging from 1 atmosphere to a few tens atmospheres, depending on the utilized apparatus and on its dimensions.

The tests herein illustrated were carried out using a glass column having an outside diameter of 45 mm (inside diameter of 40 mm) and a length of 700 mm, with an overpressure of about 1 atmosphere. As a stationary phase, a particular silica gel with low particle size (230–400 mesh, 60 Å), subjected to operative step (A), was utilized.

Tests have proved that this type of stationary phase offers the maximum efficiency and resolution when the applicated pressure permits an eluted product outflow rate of about 5 cm/minutes. Under these conditions, the fluorinated sample composed of the same perfluoropolyoxyalkylene utilized under the preceding point (a) (charged in an amount of 35% by weight referred to silica) is made to be absorbed and eluted under pressure according to modalities quite similar to the ones indicated for the atmospheric pressure chromatography.

It is to be pointed out, the qualitative results being equal, the optimization of the operative conditions:

|  | Silica | S max. | V | t |
| --- | --- | --- | --- | --- |
| P (atmospheric) | 100 g | 10 g | 1.5–2 l | 8 hours |
| P (1 atm. overpressure) | 100 g | 30–35 g | 2–2.5 l | <1 hour |

S max = maximum amount of polymer which can be treated in each cycle;
V = total elution volume;
t = total time of the various operations.

EXAMPLE 1

By introducing 100 g of silica gel (70–230 mesh, 60 Å) into a column having a diameter of 25 mm and a height of 600 mm, containing 500 ml of a methanol/Delifrene 113 mixture having a polarity degree $\epsilon$ ab=0.58, and by subsequently washing with 1,500 ml of Delifrene 113, a stationary phase was prepared.

In this column there were caused to be adsorbed 10 g of perfluoropolyoxyalkylene of formula (I), having hydroxylic functionality, where Rf had structure (1), average M.W.=2,200, n/m=0.7, s=0, and composed for 95% by weight of bifunctional species, for 5% of monofunctional species and for 0% of non-functional species, diluted in 5 ml of Delifrene 113.

By operating according to the modulaties described under point (a) (test at atmospheric pressure) there were eluted, at room temperature in 1.5 hours, the first 500 ml of Delifrene 113 containing a fraction of the starting polymer equal to 7.4% by weight, having the following characteristics:

S1: M.W.=3,750; bifunctional species content=16%

The second fraction (S2), equal to 83% by weight, was eluted in 1.5 hours with a Delifrene 113/methanol mixture 9/1 by volume (500 ml); the characteristics of this fraction were as follows:

S2: M.W.=2,300, bifunctional species content=99.8%. The last fraction (S3), equal to 5% by weight, was eluted in 1.5 hours with 500 ml of a Delifrene 113/methanol mixture 1/1 by volume; it exhibited the following characteristics:

S3: M.W.=2,000; bifunctional species content=99.9%.

EXAMPLE 2

By operating in like manner as in example 1 there were treated 10 g of a perfluoropolyoxyalkylene of formula (I), having hydroxylic functionality, where Rf had structure (1), with n/m=1.1, s=0 and average M.W.=3,400, composed for 96% by weight of bifunctional species and for 4% by weight of monofunctional species.

On conclusion of the process, the following fractions U1, U2, U3 resulted to be isolated (2 liters of solvent: Delifrene 113+methanol were utilized on the whole):

U1: 13% by weight; M.W.=6,550; bifunctional species content=29.8%

U2: 9.3% by weight; M.W.=7,100; bifunctional species content=84.4%

U3: 77.2% by weight; M.W.=3,100; bifunctional species content=99.7%.

EXAMPLE 3

In like manner as in the preceding examples, there were subjected to chromatographic analysis 10 g of a perfluoroxyalkylene having formula (I), with hydroxylic functionality, where Rf had structure (1), parameter n/m was equal to 1, s=1, having an average M.W. equal to 3,400 and consisting for 93.2% of bifunctional species, for 6.8% of monofunctional species and for 0% of non-functional species.

The following fractions were isolated (using in total 2 liters of Delifrene 113+methanol):

Z1: 18.1% by wg.; M.W.=5,800; bifunctional species content=39.8%,

Z2: 75.3% by wg.; M.W.=3,000; bifunctional species content=99.9%,

Z3: 3.5% by wg.; M.W.=2,700; bifunctional species content=n.d.

EXAMPLE 4

A stationary phase was prepared by filling a glass column similar to the one of example 1, containing a Delifrene 113/methanol mixture having a polarity degree equal to 0.58, with neutral alumina (80 g, 150 mesh, 58 Å) and then by washing with 1,500 ml of Delifrene 113.

A sample of 8 g of a perfluoropolyoxyalkylene similar to the one utilized in example 1 was subjected to chromatographic analysis in said column, operating as in example 1.

The following fractions were obtained (using in total 2 liters of Delifrene 113+methanol):

Q1: 30.3% by wg.; M.W.=4,200; bifunctional species content= 71%,

Q2: 65.1% by wg., M.W.=2,050; bifunctional species content=99.6%.

EXAMPLE 5

A sample of 30 g of a perfluoropolyoxyalkylene of formula (I), with hydroxylic functionality, having an average M.W. equal to 2,100, where Rf had structure (1), with a n/m parameter=1, s=0, and composed for 96% of bifunctional species and for 4% of monofunctional species, was subjected to chromatographic analysis on a silica bed (230–400 mesh, 60 Å, 100 g), using a device for operating at an overpressure of 1.5 atm., according to what is specified under para: (b) of the general operative modalities.

In this case the stationary phase had been prepared as in example 1, using ethyl acetate instead of methanol.

In a total elution time of less than 1 hour (using in total 3 liters of Delifrene 113+ ethyl acetate), the following fractions were obtained:

B01: 4.9% by wg.; M.W.=3,500; bifunctional species content=17%,

B02: 4.8% by wg.; M.W.=4,600; bifunctional species content=40.9%,

B03: 88.0% by wg.; M.W.=2,100; bifunctional species content=99.7%,

B04: 1.4% by wg.; M.W.=1,800; bifunctional species content= n.d.

EXAMPLE 6

By operating in like manner as in example 5, but carrying out step (A) with acetone, 30 g of a sample of the same perfluoropolyoxyalkylene was subjected to chromatographic analysis under middle pressure. Using 3 liters of Delifrene 113+acetone, the following fractions were obtained:

BM1: 6.3% by wg.; M.W.=4,400; bifunctional species content=9.5%,

BM2: 4.5% by wg.; M.W.=4,750; bifunctional species content=49.3%;

BM3: 87.0% by wg.; M.W.=2,000; bifunctional species content=99.8%.

EXAMPLE 7

According to the modalities described in example 5, 20 g of a perfluoropolyoxyalkylene of formula (I), with hydroxylic functionality, having an average M.W.=2,300, where Rf had structure (1), with n/m=1.1, s=0, and composed for 95% by weight of bifunctional species, for 5% by weight of monofunctional species, were subjected to chromatographic analysis under an overpressure of 1.5 atm.; using 3 liter of Delifrene 113+methanol, the following fractions were obtained:

BQ1: 7.9% by wg.; M.W.=3,650; bifunctional species content=20,8%,

BQ2: 11.7% by wg.; M.W.=4,500; bifunctional species content= 81.8%;

BQ3: 6.2% by wg.; M.W.=4,450; bifunctional species content=97.2%,

BQ4: 76.5% by wg.; M.W.=2,050; bifunctional species content=99.9%,

BQ5: 3.0% by wg.; M.W.=2,000; bifunctional species content=n.d.

EXAMPLE 8

In like manner as in example 5 there were treated 30 g of a perfluoropolyoxyalkylene having formula (I), with hydroxylic functionality, with Rf having structure (1), with a n/m ratio=1, s=0, an average molecular weight=2,100 and composed for 96% of bifunctional species, for about 4.0% of monofunctional species and traces of non-functional perfluoropolyoxyalkylene, which can be determined only qualitatively via N.M.R.

The following fractions were obtained:

CA1: 1.9% by wg.; M.W.=3,600; bifunctional %=1.03% (strong N.M.R. signals corresponding to non-functional chains), CA2: 9.8% by wg.; M.W.=4,500; bifunctional %=35%, CA3: 85.6% by wg.; M.W.=2,050; bifunctional %=99.6%.

To be pointed out is the absence of N.M.R. signals, which are typical of the non-functional species, in fractions CA2 and CA3.

EXAMPLE 9 (COMPARATIVE)

Following the modalities of example 5, the same perfluoropolyoxyalkylene sample was subjected to chromatographic analysis, the stationary phase having been prepared using a Delifrene/toluene mixture having an eluotropic strength ε ab=0.05.

A first fraction was collected by eluting with pure Delifrene, said fraction being equal to 0.8% (insufficient for the analysis).

In order to develop the polymer body it was necessary to pass to an elution gradient using ethyl acetate.

The recovered fraction, equal to 93.2% by weight of the polymer, exhibited almost the same M.W. and functionality characteristics as the starting rough product.

EXAMPLE 10

The column of example 5, after having been utilized in the operation described in such example, properly reconditioned with 1,000 cc of Delifrene and filled again with the same rough polyoxyalkylene, provided, by elution with ethyl acetate, a fraction (89% by weight) characterized by a bifunctional species content equal to 100%.

EXAMPLE 11

In like manner as in example 3, 65 g of perfluoropolyoxyalkylene having formula (I), with hydroxylic functionality, where R had structure (1), m/n=1, s=1, M.W.=2,100, and consisting for 94.1% of bifunctional species and for 5.9% of monofunctional species, were subjected to chromatography.

The following fractions were isolated:

D81: 22.8% by wg.; M.W.=3,550; bifunctional species content =38.2%,

DS2: 75.1% by wg.; M.W.=1,950; content=100%.

EXAMPLE 12

By operating according to the modalities described in example 5, 20 g of a perfluoropolyoxyalkylene of formula (I), having aminic functionality (—CF$_2$CH$_2$NH$_2$), with n/m=0.8, and consisting for 93.5% of monofunctional species, were subjected to chromatographic analysis by using firstly Delifrene as such and then a Delifrene/methanol mixture in a volume ratio=9/1. The total amount of utilized eluent was equal to 4 liters.

The following fractions were obtained:

DZ1: 10.1% by wg.; bifunctional species=25%,

DZ2: 86.8% by wg.; bifunctional species=99.2%.

We claim:

1. A chromatographic process for separating non-functional, monofunctional, and bifunctional species from a mixture of perfluoropolyoxyalkylenes of the general formula:

X—O—Rf—Y or for enriching the mixture in at least one of said species wherein:

$Rf$ = a perfluoropolyoxyalkylene chain having a number average molecular weight ranging from about 500 to about 10,000 and comprising one or more perfluoropolyoxyalkylene units of formula $(CF_2CF_2O)$, $(CF_2O)$, $(CF_2CF_2CF_2O)$ statistically arranged along said chain, X, Y, like or different from each other, are functional groups of formula —$CF_2$—$CH_2O(CH_2CH_2O)_sH$, —$CF_2$—$CF_2CH_2O(CH_2CH_2O)_sH$, —$CF_2CH_2NH_2$, or non-functional groups of formula —$CF_2CF_2CF_3$, —$CF_2CF_2Cl$, —$CF_2CF_3$, $CF_2Cl$, —$CF_3$, —$CFCl_2$, $CF_2Br$, —$CFBr_2$, and s = a number ranging from 0 to 2, extremes included, said process comprising subjecting the mixture of perfluoropolyoxyalkylenes to column chromatography according to the following steps:

a) preparing a stationary phase by treating a solid phase containing active sites and/or groups capable of forming bonds or interactions of the polar type, or hydrogen bonds, with the hydroxylic end groups of the perfluoropolyoxyalkylenes, with a non-polar fluorinated solvent;

b) absorption of the perfluoropolyoxyalkylene by the stationary phase, carried out by feeding to the column head a perfluoropolyoxyalkylene solution in a minimum amount of the above-mentioned non-polar fluorinated solvent;

c) elution of the perfluoropolyoxyalkylene so adsorbed by feeding the above-mentioned non-polar solvent to the column head;

d) further subsequent elution of the perfluoropolyoxyalkylene by feeding to the column head a mixture composed of the above-mentioned non-polar solvent and of a polar solvent, with volume ratios of the former to the latter ranging from about 9/1 to about 1/1; and e) washing the column containing the stationary phase with a pure non-polar solvent.

2. The process of claim 1, wherein step (a) is preceded by a treatment (A) of the stationary phase, with a mixture composed of a non-polar fluorinated solvent and of a polar solvent, and having an eluotropic strength $\epsilon$ of at least 0.2 relative to silica.

3. The process of claim 2, wherein the mixture composed of non-polar fluorinated solvent and of polar solvent exhibits an eluotropic strength $\epsilon$ ranging from 0.3 to 0.6.

4. The process of claim 1, wherein the non-polar fluorinated solvent is 1,1,2-trichloro-1,2,2-trifluoroethane.

5. The process of claim 1, wherein the stationary phase consists of silica gel.

6. The process of claim 1, wherein the stationary phase consists of an activated alumina, the pores of which have an average diameter below 200 Å.

7. The process of claim 1, wherein the polar solvent has an eluotropic strength $\epsilon$ higher than 0.30, relative referred to silica.

8. The process of claim 1, wherein after the column is washed in step (E), the stationary phase is recharged with a further perfluoropolyoxyalkylene sample which is subjected to the chromatographic treatment of steps (C) to (E).

* * * * *